June 4, 1968  R. W. BUSHMEYER ET AL  3,386,373
CROP PELLETER
Filed Oct. 24, 1965  5 Sheets-Sheet 1

INVENTORS
Richard W. Buskmeyer
David E. Krause
Carl J. Rath
BY Dressler, Goldsmith, Clement, Gordon, & Todd
ATTORNEYS June 4, 1968 R. W. BUSHMEYER ET AL 3,386,373
CROP PELLETER
Filed Oct. 24, 1965 5 Sheets-Sheet 4

INVENTORS
Richard W. Bushmeyer
David E. Krause
Carl J. Rath
BY Dressler, Goldsmith, Clement, Gordon & Ladd
ATTORNEYS 0# United States Patent Office 3,386,373
Patented June 4, 1968

3,386,373
CROP PELLETER
Richard W. Bushmeyer, David E. Krause, Rockford, and Carl J. Rath, Rockton, Ill., assignors to J. I. Case Company, a corporation of Wisconsin
Filed Oct. 24, 1965, Ser. No. 504,972
13 Claims. (Cl. 100—89)

ABSTRACT OF THE DISCLOSURE

This invention relates to a crop pelleter in which the forming rollers and the finishing rollers, either separately, or in combination, are supported, so that they can accommodate variations in the crop input into the forming chamber. To this end, the forming and finishing rollers are spring-mounted at both ends thereof.

---

The present invention relates to a field type of crop pelleting machine wherein forage or other fibrous material is picked up and formed into a densely compacted elongated roll and thereafter cut into pellets.

The crop pelleter illustrated and described herein is an improved version of a similar apparatus set forth in Bushmeyer et al. application Ser. No. 445,845, filed Mar. 25, 1965, now U.S. Patent 3,323,445, issued June 6, 1967, and assigned to the assignee of the present invention. The similarity between the machines being what they art, the present application will be specifically directed to those areas that are different and those portions which the machines have in common will be treated in a very general manner with only enough detail to provide an understanding of the present invention.

The present crop pelleter has been improved in a number of respects over the one referred to above with the overall effect being a more highly efficient apparatus capable of operating over a wider range of conditions.

Briefly, the novel pelleter disclosed herein functions to pick up hay, or other crops, from a windrow, or the like, and direct the crop into a core-forming, or wrapping chamber defined by a plurality of skewed rotating rollers, each in the shape of a hyperboloid. The forming rollers, by their wrapping and rolling action, compact and thoroughly intertwine the hay into a dense roll which after being formed in the wrapping chamber moves into an adjacent finishing chamber defined by a set of finishing rolls, where further rolling and firming of the core takes place. The core is then cut into pellets by a knife means located between a pair of adjacent finishing rolls. The aforementioned process is continuous, and thus the machine is capable of handling a large quantity of hay, forage, or other fibrous material, in a relatively short period of time.

The formation of the core and subsequent pellets is accomplished with relatively low pressure by an interweaving action of the strands of material, so that the pellets will have substantial body and will stay together when they are subsequently handled. In view of the wrapping, rolling and interweaving action, the individual fibers in each pellet can be longer than the pellet itself, and the pellets are self-supporting and stable enough for mechanized handling by ordinary, conventional machinery. Thus, it is not necessary that the material be chopped or preprocessed before being used in the pelleter.

To aid in the wrapping and finishing of the core, there is provided a spindle that is normally rotated at a speed higher than that at which the forming and finishing rollers are driven. The spindle extends through the wrapping chamber and into the chamber formed by the finishing rolls to a position adjacent the cutting wheel. The spindle may be provided with a central core and outlets into the wrapping and finishing chambers, wherein feed additives and mold inhibitors may be introduced into the center of the core being formed.

In order to accommodate variations in crop input into the crop pelleter, the forming and finishing rollers are spring-mounted at both ends thereof. This arrangement is designed to permit a variation in the diameter of the core being formed with the result that consistent pellets can be produced without varying the speed of operation of the pelleter, even though it may encounter wide variations in the quantity of product being fed into the machine.

The finishing rollers of the present device are in the form of skewed hyperboloids that are driven at the same speed as the forming rollers, and in the illustrated embodiment are driven through the forming rollers. These finishing rollers define therebetween a finishing chamber within which the core is acted on in a similar manner as in the forming chamber, with the result that the core becomes dimensionally stable because the continued rolling combined with the natural adhesiveness of the material serves to bond the individual fibers together.

In order to improve the surface characteristics of the forming and finishing rollers they are rubber-coated. This makes the rollers easier to produce, and the elastic surface can deflect and crack loose any coating of material built up thereon without necessitating the use of scrapers to keep the rollers clean.

The cutting means used for cutting the core into pellets is a large wheel having a plurality of knives spaced along its circumference, which moves with the rotating core during the cutting action. To facilitate separating of the pellets from the cutter, there are provided stripping wheels located at the exit end of the finishing chamber. These strippers are free-wheeling and serve to strip the pellets from the rotating knives.

A few of the advantages of this pelleter design are, (1) ability to handle various quantities of crop material being fed into the wrapping chamber, (2) longer period during which the crop is intertwined to form more stable pellets or wafers, (3) a minimum of torsional slippage and abrasion of the core during the finishing process, (4) introduction of feed activities and mold inhibitors to improve the quality and feeding value of the pellet or wafer, (5) positive stripping of the pellet or wafer from the cutter to facilitate handling, and (6) a roller design which permits ease of production and maintenance.

These and other advantages will be apparent from the following description when taken in conjunction with the attached drawings, wherein.

Figures 1, 2:
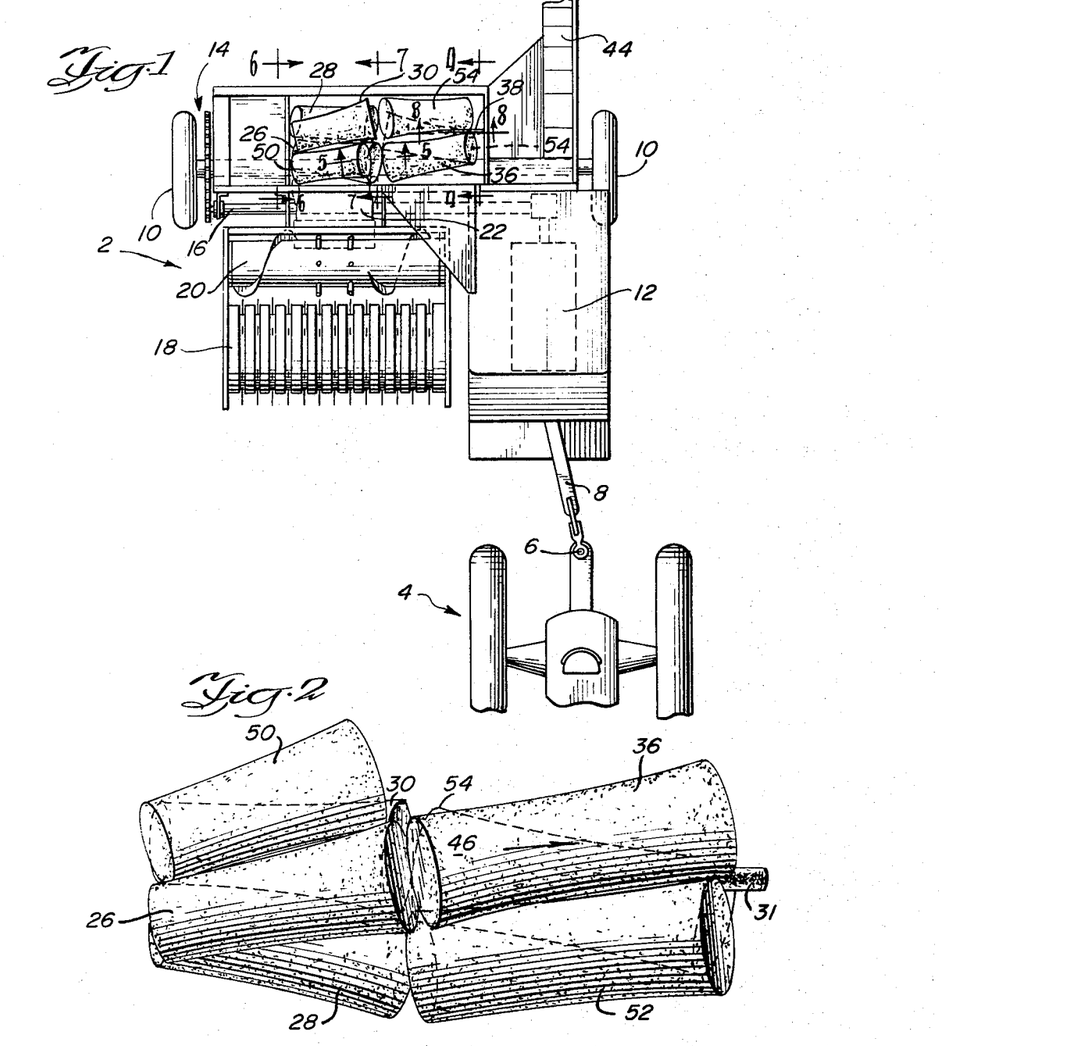
FIGURE 1 is a plan view of a machine embodying the invention shown coupled to a tractor, with parts being broken away and others omitted to avoid confusion.
FIGURE 2 is an enlarged view of the forming and finishing roller assemblies.

Referring first to FIGURE 1, there is illustrated a crop pelleter 2 that is drawn behind a tractor 4 through a hitch 6 and drawbar 8. The pelleter 2 is supported by the tractor and ground engaging wheels 10. The power for the pelleter is provided by a prime mover 12 which drives the various mechanisms through a power train 14 including a drive shaft 16.

Briefly, the crop material to be treated or formed into cores or pellets is gathered from the field by a pickup, generally designated at 18, the crop having previously been harvested by any suitable cutting mechanism. The crop is then deposited on a disappearing finger auger conveyor 20, the details of which are not important to the present invention, but if further information is desired, attention is directed to Oberholtz et al. Patent No. 2,644,292, issued July 7, 1953.

The material from the conveyor 20 is moved onto high-speed belts 22 which feed it into a core-forming or wrapping chamber 24. The various elements of the pickup and feeding mechanism tend to accelerate and thin out the stream of material to be directed into the wrapping chamber. The progressive thinning out of the windrow is accomplished by (1) operating the pickup at a speed faster than ground travel, (2) driving the auger with retractable fingers faster than the pickup, and (3) moving the high-speed feed belts at a still higher speed. This action also tends to align and orient the material for most efficient wrapping.

The material in stream form is then introduced into a forming chamber formed between three continuously rotated, specially shaped rollers 26, 28, 30, which in the illustrated embodiment are in the form of hyperboloids.

The crop material is wrapped onto a dense rapidly rotating core 31 by the forming rollers, preferably with the assistance of a rotatable spindle 32 between the rollers, although it is to be understood that the invention is not limited to the use of a spindle. The core 31 is given a positive axial movement in a direction transverse of the tractor in FIGURE 1, by reason of the rotation, shape and positioning of these rollers. The core of material is expelled into a finishing chamber 34 formed by a plurality of circumferentially spaced finishing rollers, one of which is indicated at 36. The material is moved along the length of the finishing rollers and partway along the length of the finishing rollers is cut into desired lengths by a cutting device or wheel 38.

The short lengths of the core of crop material in the form of pellets 39 are stripped off of the cutter by a pair of rubber stripping wheels 40, 42 and expelled into a hopper or chute from which they are picked up and taken by an elevator 44 to a trailing vehicle or other point of disposition.

The core 31 in the forming chamber is caused to move lengthwise of the forming rollers by mounting them so that they are skewed in relation to the core. The axes of the rollers are non-parallel and non-intersecting. The rollers are mounted so that the axes of the rollers cross each other in spaced relation, and the forming rollers are clustered about the core-forming chamber 24 in such a position that the ends of their axes, adjacent the exit end of said chamber, are circumferentially displaced about said chamber in the angular direction that the rollers are intended to turn.

The skewing relationship of the rollers 26, 28, 30, hereinabove set forth, will develop a very powerful and positive force tending to cause expulsion of the core axially thereof from said core-forming chamber. The angle of skewing will determine the rate at which the core is expelled, given a predetermined speed of rotation of the core-forming rollers. The angle of skewing is defined as that angle between the axis of the core and the axis of one of the wrapping rollers, when both core and wrapping roller are projected in a true plane. In order to obtain rapid movement of the core, the angle of skewing of the rollers will have to be substantial, as, for example, something on the order of 1 to 20 degrees. It is to be understood that the rollers can be rotated at an increased speed with an attendant decrease in the angle of skewing, and still obtain the desired expulsion rate of the core. The skewing angle, speed of rotation of the core-forming rollers, and the diameter of the roll can be varied in any manner desired to obtain the desired characteristics of operation.

The forming rollers are in the shape of hyperboloids which, as set forth in detail in the aforementioned Bushmeyer et al. application, and briefly set forth hereinbelow, provide the desired results. These rollers, as illustrated in FIGURE 2, progress from a relatively smaller diameter at one end to a larger diameter at the other. The direction in which the rollers rotate determines the direction of progress of the core, and the rollers are rotated so that the core moves out at the discharge end of the forming chamber, adjacent the larger ends of the rollers.

The aforementioned roller design substantially avoids sliding of the crop in relation to the forming rollers, and also avoids twisting of the core. In other words, the fibers of crop material will be moving at substantially the same angular velocity throughout the length of the core, which prevents the twisting and breaking of the fibers and attendant reduction in the strength of the pellets. Also, it is advantageous to have the core-forming chamber flared toward its exit end to accommodate the increasing cross section of the core as it has material added to it in its passage along the length of the rollers. With this design, the ratio of the diameters of the core and the rollers is such at any point in the length of the core-forming chamber that the tangential velocities of the rollers and core are properly matched, so there is little or no slippage between the mating surfaces.

Figure 3:
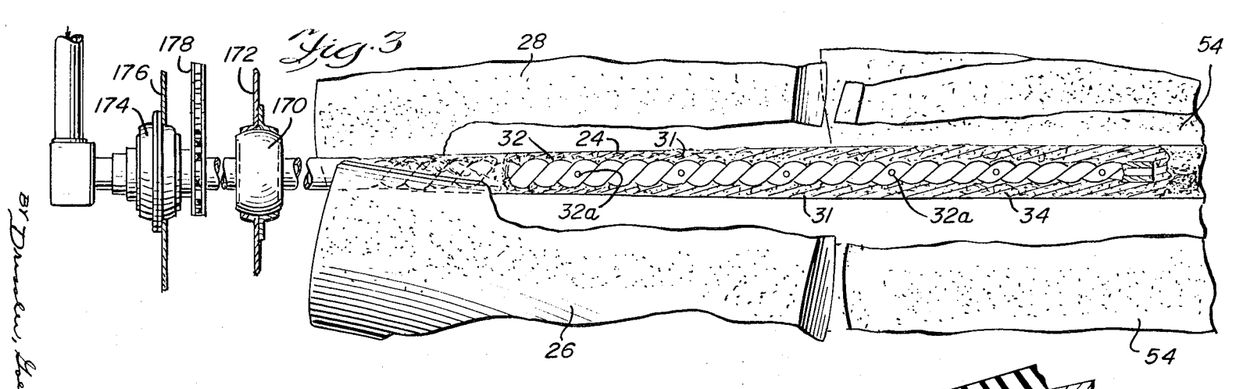
FIGURE 3 is an enlarged detail view showing the relationship of the spindle to the finishing and forming rollers.
Figure 8:
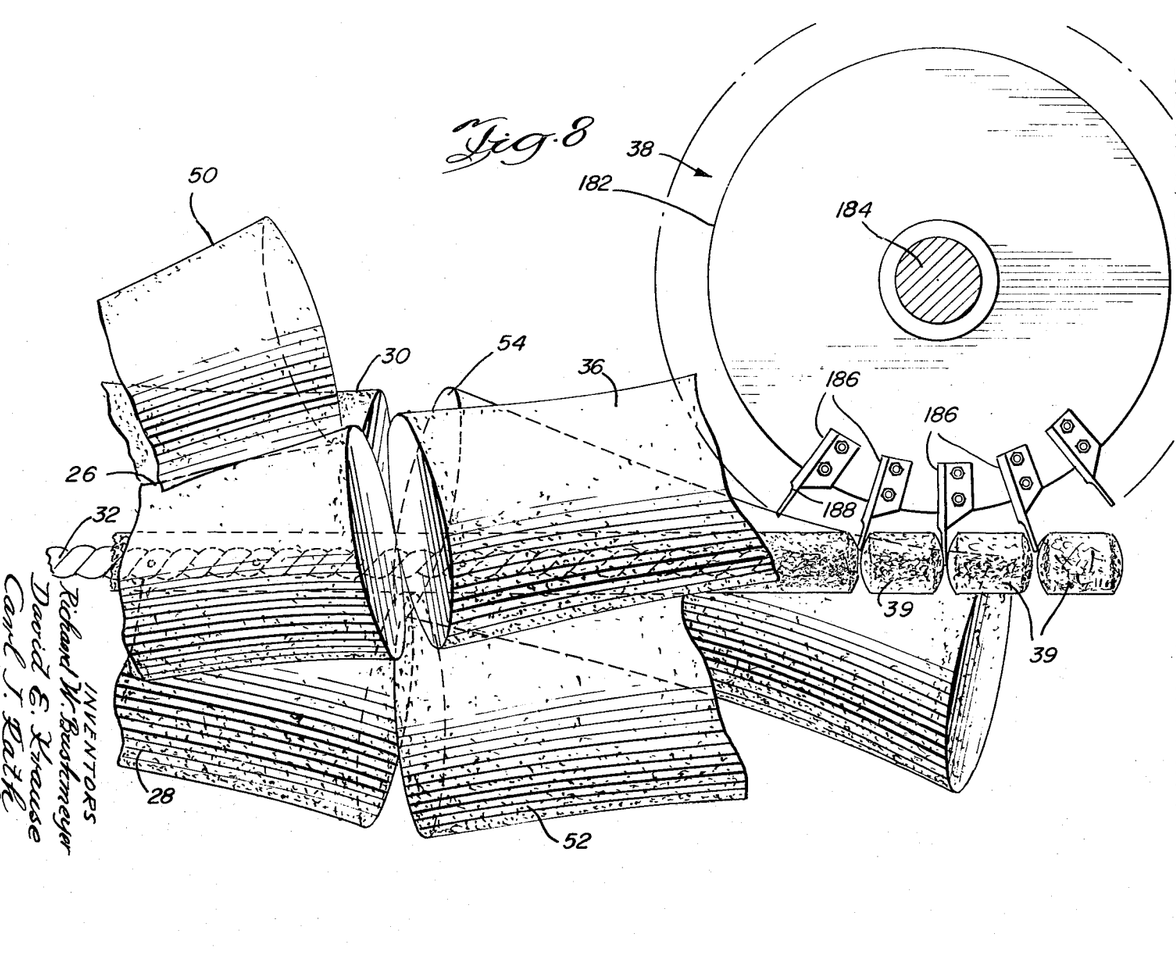
FIGURE 8 is a view showing the relationship between the cutting wheel and the core during the cutting action of the core into pellets.

The application of this principle is generally illustrated in FIGURES 3 and 8. In these views, the core is being formed in a space or chamber 24 generally in the configuration of a hyperboloid, and is rotation toward the observer, or counterclockwise as seen from the right. The core is designated as 31 and is moving axially in the direction indicated by the arrow 46 in FIGURE 2, or toward the larger ends of the rollers.

The manner in which the core is formed is well shown in FIGURE 2. The crop material is fed between the charging and forming rollers transversely of core 31. The means by which the various rollers are supported in these relations are shown elsewhere in the drawings and will be fully described hereinafter. It will be clear that the action of the rollers 26, 28, and 30 will be to wrap and entwine the crop material into a mass of rotating, generally helically and spirally arranged compacted fibers, and to positively expel the rotating mass axially of the core-forming chamber. Furthermore, by reason of the fact that aforesaid ratio between the diameters of the rollers and core is proper, there will be a true roller contact between the rollers and the core throughout the line of contact therebetween. As the core will be caused to rotate the same number of turns at one end as the other, in a given time, there is no twisting of the core, but a simple building up of the fibers as they are tightly wound on each other, and a compacting and positive expulsion of the mass by the action of the rollers.

In accordance with the present invention, the forming rollers 26, 28, 30 are rubber-coated. A rubber-coated roll has a number of advantages over a metal-surface roll. For example, a rubber-coated roll having a hyperbolically curved surface is relatively easy to make since this can be accurately produced in the rubber coating. This eliminates a great deal of cost otherwise incurred when machining a metal roll. This arrangement also provides for better balance because the eccentricity of the roll is in a lower density material reducing the vibration in the finished machine. Furthermore, the elastic surface of the rollers can compress, thus reducing the peak pressures on the rollers, and it acts to spread the pressure over a greater on the material being rolled. This reduces the shock to the machine members and bearings. Another feature of the rubber coating is that it can flex and crack loose any coating of material that is built up thereon without requiring the use of scrapers to keep the rollers clean. Additional advantages of such a design are, (1) the coefficient of friction between hay and rubber rollers is greater than that between hay and metal rollers, (2) a traction tread can be molded into the rubber-surfaced rollers, and (3) the elastic surface will partially envelop or encompass foreign objects or stones in the event they are accidentally introduced into the machine, thus minimizing damage to the machine.

A charging roller 50 is located above roller 26 and as illustrated is in the shape of a hyperboloid. This roller is to aid in feeding the crop material into the core-forming chamber. Forming rollers 26, 28 and 30 are rotated in a common clockwise direction, while roller 50 is rotated in a counterclockwise direction, as viewed from the large end of the forming rollers in FIGURE 2. The resulting bite between rollers 50 and 26 is utilized to feed crop material into the core-forming chamber 24, as will be described in detail.

The crop material coming from the feed belts 22 is caught in the bite between rollers 26 and 50, and propelled into the space between rollers 30 and 26, which space is more generous than that between rollers 28 and 30 and between rollers 28 and 26, respectively.

To assist in starting the desired winding of the crop material, and also to assist in controlling the axial movement of core 31, a spindle generally designated as 32, FIGURE 3, occupies a substantial portion of the center of the core-forming chamber 24. The operation and effectiveness of the spindle will be described in detail following the discussion of the forming and finishing roller system. At this time, it is noted that the presence of spindle 32 produces a void within core 31 which, even if filled by inward expansion of the core of crop material when it is stripped off of the spindle by the action of the rollers, will remain as a central region of less density than would be the case if the spindle were not present. In this way, a hard central core within the resulting pellets is avoided, and it is contemplated that pellets could be made by this process in which the void would persist to the extent that the pellets would have actual openings therethrough. Such openings would be valuable in furnishing ventilation and in drying pellets which might have been made from excessively moist crop material.

The core formed in the forming chamber 24 is moved into the finishing chamber 34, which is defined by three hyperboloid rollers 36, 52, 54 that are located adjacent to and rotated by core-forming rollers 26, 28, 30, respectively. These rollers function in a manner similar to that described with respect to the forming rollers in that they contain the compacted crop material as a dense mass of rotating, generally helically and spirally arranged fibers. There is, in fact, a true rolling contact between the rollers and the core throughout the line of contact therebetween, and thus there is no twisting of the core, but merely a continuing of the compacting and subsequent positive and continuous expulsion of the core from the finishing chamber. The details of the finishing roller assembly will be discussed in detail hereinafter.

Figure 4:
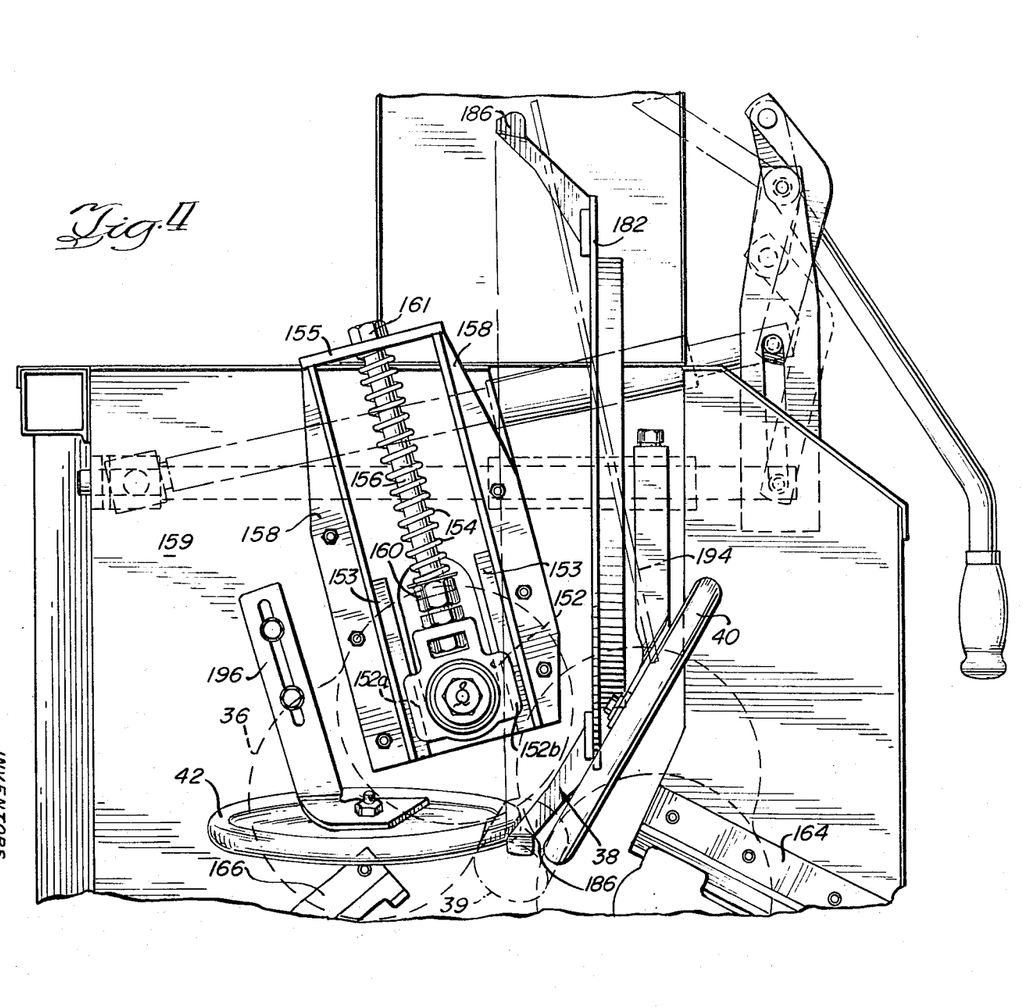
FIGURE 4 is a view taken along line 4—4 of FIGURE 1 showing the spring mounting for the outlet end of the finishing rollers.

In order to compensate for different rates of feeding, since windrow size and ground speed cannot always be perfectly correlated to give a constant input of hay or forage to the forming chamber, the forming and finishing rollers are spring-mounted at both ends thereof. This arrangement permits the hay core to increase in diameter as the input to the machine increases and to shrink in diameter as the input to the machine decreases. In the illustrated embodiment, the resilient mounting of the various rollers provides for sufficient movement thereof to allow for a 50% change in feed rate assuming a constant expulsion rate of the hay or forage core. The spring setting also serves to determine the density of the core. In the present system, both ends of the rollers are permitted to move in and out substantially in order to vary hay core diameter and thus accommodate various feeding rates. The end movement of the rollers is restrained to a carefully prescribed path which is approximately a radial line that passes through the core centerline and the contact point of the roller and core. In this manner, the core may be allowed to change substantially in diameter without introducing gross inefficiency due to slippage. The details of the spring mounting arrangement for the forming rollers are shown in FIGURES 6 and 7 and the details of the spring mounting for the finishing rollers are illustrated in FIGURES 4 and 7.

Figure 6:
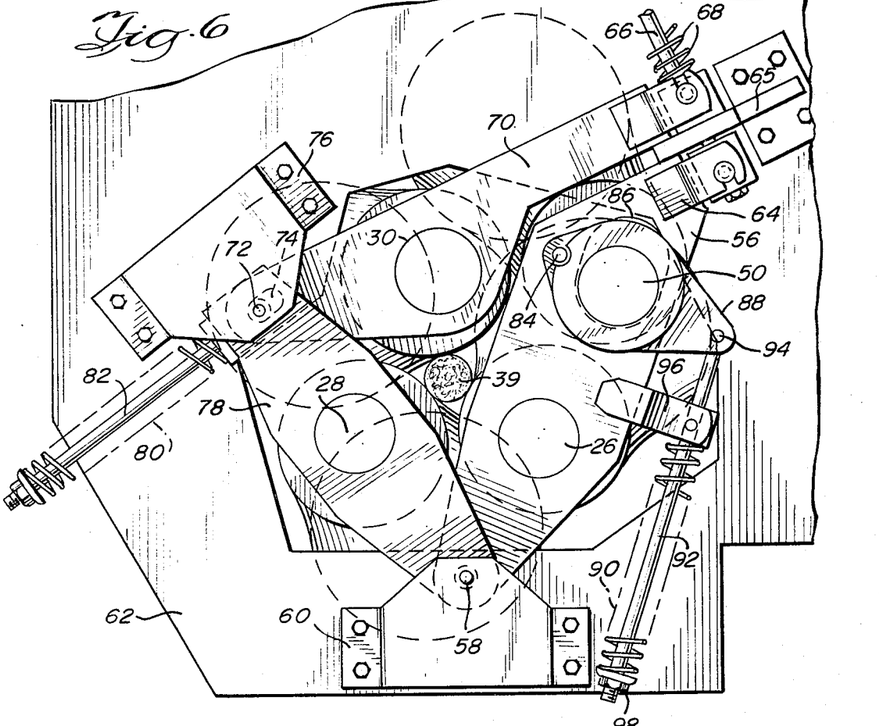
FIGURE 6 is a view taken along line 6—6 of FIGURE 1 showing the mounting of the near end of the forming and charging rollers.
Figure 7:
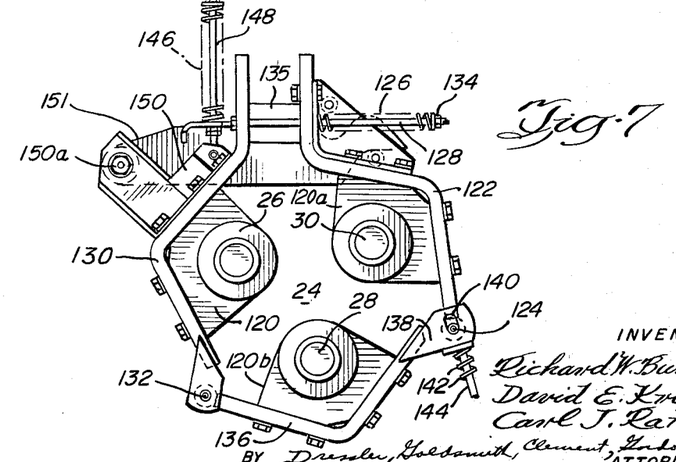
FIGURE 7 is a view taken along line 7—7 of FIGURE 1 showing the resilient mounting for the exit end of the forming rollers, charging roller, and the inlet end of the finishing rollers.

Turning first to FIGURE 6, there is shown the means whereby the small end of the forming rollers 26, 28, 30 is spring-biased inwardly to define the smallest diameter of the core-forming chamber 24. There is also illustrated in FIGURE 6 a spring-biased means for the small end of the charging roller 50 to provide for variations in the material being fed into the core-forming chamber.

Dealing first with the spring mounting for the core-forming rollers, it will be seen that the core-forming roller 26 which cooperates with the charging roller 50 has its small end thereof supported by suitable bearings in an opening in beam 56 that is pivotally mounted at 58 to a bracket 60 that is affixed to a vertically extending main frame member 62. The opposite end of beam 56 has secured thereto a bracket 64 to which is connected the lower end of a rod 66 that is spring-biased upwardly through a suitable connection by a coil spring 68 to rotate beam 56 in a counterclockwise direction about pivot 58 to bias roller 26 in toward the core-forming chamber 24. The counterclockwise movement of beam 56 and associated core-forming roller 26 is limited by the engagement of beam 56 with a stop member 65 secured to frame 62.

The core-forming roller 30 has its smaller end disposed in a beam 70 similar to the one supporting core-forming roller 26. The left-hand end of beam 70 is pivotally mounted about pin 72 which is suitably affixed to bracket 76 that is in turn secured to frame member 62. The opposite end of beam 70 is spring-biased in a clockwise direction relative to pivot 72 by spring 66. The clockwise movement of beam 70 is limited by stop member 65.

The remaining core-forming roller 28 has its smaller end supported by beam 78 which is similar to beam 56, 70 heretofore discussed. The upper end of beam 78 defines a slot 74 within which is located pin 72 and its lower end is pivotally connected about pivot 58. The slot 74 permits arcuate movement of beam 78 relative to pivot 58 and beam 78 and associated roller 28 which are biased clockwise relative to pivot 58 by spring 80 disposed about rod 82. Clockwise movement of roller 28 is limited by pin 72.

The aforementioned mounting means results in resiliently biasing the forming rollers inwardly to define the core-forming chamber 24 of a predetermined minimum diameter. When the crop is introduced into the forming chamber at a rate in excess of that that can be normally accommodated in chamber 24, the additional material will act to move the forming rollers outwardly against the action of their respective springs. The springs are designed to allow for a predetermined movement such as to allow an increase in 50% of the size of the forming chamber. It is, of course, understood that the opposite ends of the forming rollers are also resiliently mounted to allow for what amounts to essentially radial movement of the rollers to expand the core-forming chamber. The mounting for the opposite end of the rollers will be discussed in detail hereinafter.

It remains to note that the charging roller 50 which coacts with the forming roller 26 to define the charging opening is also spring-biased to define a minimum opening and is free to move relative to the roller 26 to allow additional material to be directed into the core-forming chamber. To this end, the charging roller 50 is pivotally mounted relative to beam 56 by pivot pin 84. The end of the charging roller extends through a slot 86 defined in the beam 56, which slot permits arcuate movement of the roller relative to beam 56. The end of the roller 50 is located in a plate 88 which is spring-biased in a clockwise direction relative to pivot 84 through the action of a compression spring 90 disposed about a rod 92 that is secured at its upper end to a pin 94 connected to the outer end of plate 88. The upper end of spring 90 bears against a bracket 96 secured to beam 56 and urges the rod by engagement with nut 98 in a downward direction to move the charging roller toward the forming roller 26. Here again the charging roller is resiliently mounted at its other end to permit essentially radial movement of the charging roller relative to forming roller 26.

Turning now to the resilient support for the other end of the forming rollers and the charging roller, it is first to be noted that the resilient support means located at the other end also functions to resiliently support the adjacent end of the finishing rollers.

Figure 5:
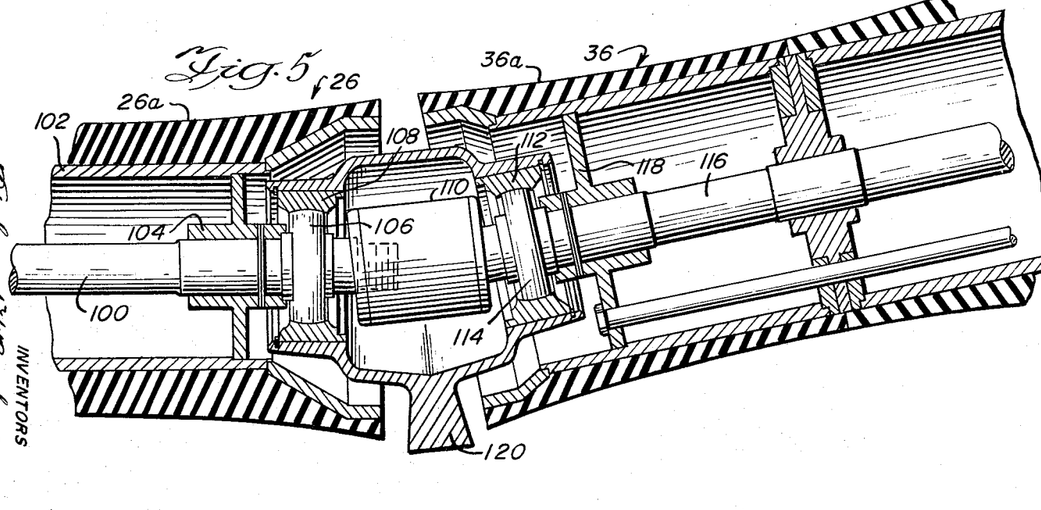
FIGURE 5 is a sectional view showing the driving interconnection between the forming and finishing rollers.

The interconnection between the forming and finishing rollers is best illustrated in FIGURE 5, which discloses the mechanisms employed for supporting adjacent forming and finishing rollers and for driving the finishing rollers through the forming roller. As shown in FIGURE 5, there is illustrated the forming roller 26 which is interconnected by suitable means to be described hereinafter to finishing roller 36 for driving roller 36 covered by a rubber coating 36a at the same speed as roller 26. The forming roller 26 is secured to a power-driven shaft 100 through one or more braces 104 which interconnect the shaft 100 to the metal shell 102 of the roller. Disposed about the metal shell 102 is the rubber coating 26a which is cut into the shape of a hyperboloid, as hereinbefore described. The connection between the forming roller and the finishing roller consists of a universal joint 110 through which shaft 100 drives shaft 116 of finishing roller 36. The shaft 100 is supported relative to casing 120 through a bearing 106 located in a bearing housing 108 that is in turn affixed to casing 120. The other end portion of casing 120 contains a bearing housing 112 within which is located a bearing 114 secured to the shaft 116.

With this novel design, the adjacent ends of the forming and finishing rollers can be resiliently mounted to permit essentially radial movement thereof to permit expansion of the core-forming and core-finishing chambers, respectively, by resiliently mounting the casing 120. It is to be noted that an arrangement as shown in FIGURE 5 is provided for interconnecting forming rollers 28 and 30 to finishing rollers 52 and 54, respectively.

Turning now to FIGURE 7, there is illustrated the means whereby the casings 120, 120a, and 120b supporting adjacent forming and finishing rollers are resiliently mounted to permit the requisite movement of the forming and finishing rollers. It is to be remembered that with the description of this mounting means, the mounting for the forming rollers will be complete, but there, of course, has to be a resilient mounting for the opposite end of the finishing rollers, which will be discussed hereinafter in respect to FIGURE 4.

The mounting of the large ends of the forming rollers and the adjacent ends of the finishing rollers as shown in FIGURE 7 is broadly similar to that disclosed in FIGURE 6 when describing the mounting for the small ends of the forming rollers. Essentially, the large end of the forming roller 30 and adjacent end of finishing roller 54 supported by casing 120a consists of an S-shaped bar 122 to which the casing 120a is affixed. The bar is pivotally mounted at its lower end to a pivot pin 124 which extends into a stationary frame member (not shown). The opposite end of the bar 122 is spring-biased to the left to move the roller 30 in a counterclockwise direction toward the core-forming chamber by the action of spring 126 disposed about a rod 128. The rod 128 and spring 126 perform a dual function of resiliently biasing in a clockwise direction the adjacent S-shaped support bar 130 which has secured thereto the casing 120 that supports rollers 26 and 36. This is accomplished by extending the rod 128 through openings in support bars 122 and 130 and positioning it in place relative to support bar 122 by a nut 134. The lower end of support bar 130 is held in place relative to a main frame member (not shown) while being free to move relative thereto by a pivot pin 132. Movement of adjacent ends of the bars 122, 130 toward each other is controlled by a spacer 135 that is also secured to a main frame member.

The forming roller 28 and finishing roller 52 are resiliently supported at their adjacent ends by bar 136 to which is secured the casing 120b. This assemblage is biased in a counterclockwise direction about pivot pin 132 by means of a spring 142 disposed about a rod 144 suitably connected to pivot pin 124. The spring acts against bracket 138 secured to the end of L-shaped support 136. The movement of support bar 136 relative to pivot pin 124 is permitted by the slot 140 formed in end bracket 138. Thus, it can be seen that the large end of the core-forming rollers and the adjacent end of the finishing rollers are biased inwardly to form the minimum size core-forming chamber 24, but they are free to be moved outwardly in the event an increased amount of material is fed into the core-forming chamber by charging roller 50 and the core-forming roller 26. It remains to note that the spring mounting for the end of the charging roller adjacent the large end of the forming rollers is provided by a spring 146 disposed about a rod 148 which is secured at its lower end to a bracket 150 connected to the support bar 130 to bias bracket 151 in a clockwise direction about pivot point 150a. Suitable stop means (not shown) are provided for limiting the pivotal movement of bracket 151 in both the clockwise and counterclockwise directions.

Turning now to FIGURE 4, there is illustrated the resilient mounting means for the exit end of the finishing rollers. It is to be observed that only the resilient mounting means for one of the finishing rollers is completely illustrated in FIGURE 4. Portions of the other two identical assemblies are seen at 164, 166.

The end of the finishing roller 36 is supported in a bearing 152 having outwardly directed guides 152a, 152b, which are bifurcated to straddle tracks 153. Bearing 152 carries a shaft forming a part of finishing roller 36, so that the latter may be shifted in position to vary the diameter of the finishing chamber. The bearing 152 and roller 36 are urged inwardly by spring 154 that is engaged with a plate 155 affixed to L-shaped sections 158 that are in turn secured to a main frame member 159. The spring 154 is disposed about a rod 156 and acts downwardly against nuts 160 to bias the end of the finishing roller toward the finishing chamber, the downward movement of the bearing being limited by the engagement of nut 161 on rod 156 with plate 155. Thus, it can be seen that the exit ends of the finishing rollers are free to move outwardly to accommodate a large core in the core-finishing chamber.

Extending through the core-forming chamber and into the core-finishing chamber an appreciable distance is a helical spindle 32 which serves a number of purposes. Initially, the spindle serves to aid in starting the formation of a core in the core-forming chamber. As shown in FIGURE 3, the spindle extends axially through the core-forming and finishing chambers and is carried in a bearing 170 supported on a plate 172, and also in a bearing 174 supported on a plate 176 forming part of the framing of the pelleter. A suitable driving mechanism is provided as illustrated at 178 to drive the spindle in the opposite direction and at a speed proportional to that of the forming rollers. The rotation of spindle 32 starts the wrapping and entwining of the crop fibers immediately after their entering chamber 24, which core is urged axially by the motion of the rollers. The helical spindle 32 tends to axially expel the hay core at the same speed as the rollers when the wrapping and forming chamber 24 is receiving the maximum quantity of incoming hay for a given core density as determined by the spring settings. When the wrapping and forming chamber 24 is receiving less than the desired quantity of incoming hay for a given core density, the helical spindle 32 retards or slows the axial movement or expulsion rate of the hay core, and in this way tends to maintain a constant core density, even through varying quantities of incoming material are being supplied to the wrapping chamber 24.

Thus, in addition to the flexibility in feeding rate afforded by the spring mounting of the rollers alone, as previously described, flexibility is also achieved by the interaction of the helical spindle, spring-mounted rollers, and hay core. The hyperboloid rollers are powered at a constant rotational speed and hence tend to expel the hay core from the chambers at a fixed rate and to impart a constant tangential velocity to the hay core. While this tangential velocity (or peripheral velocity) of the hay core will remain constant, the rotational speed, as measured in revolutions per minute, will vary. The rotational speed of the hay core will be at a minimum when the core diameter grows to a maximum, and the rotational speed of the core will be at a maximum when the core diameter has shrunk to a minimum as at low rates of feed.

The power-driven helical spindle is driven at a fixed rotational speed and the rate at which the spindle tends to expel the hay core is a function of its lead, and the difference between the core rotational speed and spindle rotational speed. Thus, when the hay core is small in diameter and spinning at maximum r.p.m. corresponding to low rates of feed the r.p.m. of the hay core and the r.p.m. of the spindle approach each other. If these two speeds became equal, the helical spindle would not tend to expel the core at all. In the actual embodiment, when the hay core is a minimum diameter, the lead of the spindle and the relative speeds have been proportioned such that the spindle tends to expel the core at one-half the rate which the hyperboloid rollers tend to expel the hay under this condition. As the spindle grips the hay core more firmly than the rollers, there is some slippage in an essentially axial direction along the line of contact between the hay core and rollers. This slippage, within the limits chosen, along the line of contact in an axial direction has not been found to be excessively detrimental to wafer quality as contrasted to slippage at the line of contact in the transverse plane of the core which tends to twist the hay core and shred the outer fibers from it.

In the illustrated embodiment, the lead of the helical spindle and relative speeds between the hay core and spindle is such that the expulsion speed of the spindle exactly matches the expulsion speed imparted by the hyperboloid rollers when the hay core is rotating at minimum r.p.m., which corresponds to the condition of maximum core diameter and feeding rate. At this time, there is zero theoretical slippage along the line of contact between core and roller, and this results in maximum efficiency when the wafering machine is operating at peak capacity.

From the foregoing description, it is apparent that a 50% change in feed rate may be accommodated due to the change in volume of the hay core and a 50% change in feed rate may be accommodated by the change in expulsion rate. Thus, the combined effect of these two features is that feed rates of 25% to 100% of maximum capacity may be handled, which is adequate to meet general field conditions.

The unique action of the resiliently mounted rollers and screw-type spindle functions to automatically adjust machine capacity to the instantaneous feeding rate which is dependent on windrow size and ground travel as regulated by the operator. This is achieved without the need for complicated hydraulic, mechanical, or electrical devices to automatically regulate roller speed or spindle speed.

The spindle 32 is provided with openings 32a through which feed additives and mold inhibitors may be introduced into the center of the core being formed.

Spindle 32, in addition to starting the wrap of the core, is capable of transmitting a great amount of power thereto to keep it in positive rotation by virtue of its size, length and frictional charcateristics. Positive rotation tends to insure proper wrappings and forming of the hay core resulting in well bonded, stable wafers.

After the core has been formed, it is cut into pellets by a cutter wheel, as shown in FIGURE 8. The cutter wheel 38 comprises a disk 182 fixed in any suitable manner on a shaft 184 and is provided with a multiplicity of knives 186 mounted around the periphery of disk 182. Each knife is preferably formed of a strip of suitable material and has a plate portion 188 which has a sharp cutting edge. The sharp edge is presented to the surface of the rapidly rotating fibrous material and cuts readily into the core. As any of the knives enter into the moving core, it will be carried along by the axial movement of the core and thus cause rotation of the wheel 180. Such rotation will present the next knife to the hay core which will be carried along as before. This knife will be caught and carried along presenting the next knife, and so on, the length of the pellets being determined by the choice of spacings between the knives 186.

As shown in FIGURE 1, the knife is located between a pair of adjacent finishing rollers and thus the core is supported within the finishing chamber during the cutting action. When the pellet leaves the finishing chamber and is carried by the knife blade, there is a possibility that the pellet may tend to stick to the knife blade and not be freely expelled. To avoid this contingency, the pelleter is provided with stripping wheels located adjacent the exit end of the finishing chamber. These stripping wheels, as shown at 40 and 42 in FIGURE 4, are essentially rubber-covered wheels that are free-wheeling on brackets 194, 196, respectively. Stripper wheel 42 is set at an angle of 110° to the knife wheel axis and skewed upward, and tangent to the knife diameter to start the pellet moving outward. Stripping wheel 40 is set parallel with the knife to finish the stripping of the pellet.

*Method of operation*

The operation of the pelleter is thought to be clear from the foregoing description, but by way of summary, it is pointed out that the previously harvested crop is picked up by pickup 18, fed to an auger conveyor 20 and belts 22 into the bite between the charging roller 50 and forming roller 26. The crop is then formed into a core about spindle 32 and given a strong axial component by the rotation of the specially shaped skewed rollers. The crop moves from the core-forming chamber into the core-finishing chamber, where the core continues its true rolling motion. Before leaving the finishing chamber, the core is cut into pellets by the cutter wheel and the pellets are stripped from the cutter wheel by stripper wheels disposed adjacent the end of the core-finishing chamber. Variations in feed are accommodated by the resilient mounting of the wrapping and finishing rollers in conjunction with the unique controlling action of the helical spindle, which gives the machine a broad versatility.

There are, of course, many modifications that can be made within the scope of the present invention, and it is not intended to be limited except in the manner covered by the claims found hereinafter. For example, the forming rollers, while shown as increasing in size from one end to the other, could be formed in the same manner as the finishing rollers and any portion thereof.

What is claimed is:

1. A pelleting device for feed crops including a plurality of forming rollers, each generally in the shape of a hyperboloid varying in diameter from one end to the other and arranged in position to provide a wrapping chamber therebetween for forming the material into a core, means for feeding crop material into said wrapping chamber, means for rotating said rollers in a common direction, the axes of said forming rollers being skewed in relation to said wrapping chamber and being circumferentially displaced about said wrapping chamber in the angular direction of rotation of said forming rollers, means for resiliently mounting the ends of said rollers to permit changes in the size of said wrapping chamber, whereby the wrapping chamber can accommodate varying quantities of crop material being fed thereto, and a plurality of finishing rollers, each generally in the shape of a hyperboloid and disposed adjacent to said forming rollers and defining a finishing chamber which receives the material from said wrapping chamber, and cutting means for cutting said core into pellets.

2. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the direction of angular rotation of said forming rollers, a plurality of finishing rollers disposed adjacent to said forming rollers and defining a finishing chamber which receives the material from said wrapping chamber, means for resiliently mounting the ends of said forming and finishing rollers for radial movement relative to the core to permit changes in the size of said wrapping and finishing chambers to accommodate varying quantities of crop material, and cutting means for cutting said core into pellets.

3. A pelleting device for feed crops including a plurality of forming rollers, each generally in the shape of a hyperboloid increasing in size from one end to the other and arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at the large end thereof the forming rollers are circumferentially displaced about said wrapping chamber in the direction of angular rotation of said forming rollers, a plurality of finishing rollers, each generally in the shape of a hyperboloid and disposed adjacent to said forming rollers to define a finishing chamber which receives the material from said wrapping chamber, means for resiliently mounting the ends of said forming and finishing rollers to permit changes in the size of said wrapping and finishing chambers to accommodate varying quantities of crop material, and cutting means for cutting said core into pellets.

4. A pelleting device for feed crops including a plurality of forming rollers, each generally in the shape of a hyperboloid increasing in size from one end to the other and arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at the large end thereof the forming rollers are circumferentially displaced about said wrapping chamber in the direction of angular rotation of said forming rollers, a plurality of finishing rollers, each generally in the shape of a hyperboloid and disposed adjacent to said forming rollers and defining a finishing chamber which receives the material from said wrapping chamber, said rollers being rubber-coated, and cutting means for cutting said core into pellets.

5. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the angular direction of rotation of said forming rollers, a plurality of finishing rollers disposed adjacent to said forming rollers and defining a finishing chamber which receives the material from said wrapping chamber, means for resiliently mounting the ends of said forming and finishing rollers to permit changes in the size of said wrapping and finishing chambers to accommodate varying quantities of crop material, a cutter wheel for cutting said core into pellets extending into said finishing chamber, and stripper wheels located adjacent the exit end of said finishing chamber and positioned to cooperate with said cutter wheel to strip the pellets therefrom.

6. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the direction of angular rotation of said forming rollers, means for resiliently mounting the ends of said rollers to permit changes in the size of said wrapping chamber whereby the wrapping chamber can accommodate varying quantities of crop material being fed thereto, and a plurality of finishing rollers disposed adjacent to said forming rollers and defining a finishing chamber which receives the material from said wrapping chamber, cutting means located within said finishing chamber for cutting said core into pellets, a spindle extending through said wrapping chamber and into said finishing chamber adjacent the cutting means, said spindle defining openings for introducing additives into said chambers, and means for driving said spindle.

7. A pelleting device for feed crops including a plurality of forming rollers, each generally in the shape of a hyperboloid increasing in size from one end to the other and arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at the large end thereof the forming rollers are circumferentially displaced about said wrapping chamber in the direction of angular rotation of said forming rollers, a plurality of finishing rollers, each generally in the shape of a hyperboloid and disposed adjacent to said forming rollers to define a finishing chamber which receives the material from said wrapping chamber, means for resiliently mounting the ends of said forming and finishing rollers to permit changes in the size of said wrapping and finishing chambers to accommodate varying quantities of crop material, each of said rollers being rubber-coated, cutting means located in said finishing chamber for cutting said core into pellets, and stripper wheels located adjacent the exit end of said finishing chamber and positioned to cooperate with said cutting means to strip the pellets therefrom.

8. A pelleting device for feed crops including a plurality of forming rollers, each generally in the shape of a hyperboloid increasing in size from one end to the other, arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at the large end thereof the forming rollers are circumferentially displaced about said wrapping chamber in the direction of angular rotation of said forming rollers, a plurality of finishing rollers, each generally in the shape of a hyperboloid and disposed adjacent to said forming rollers defining a finishing chamber which receives the material from said wrapping chamber, means for resiliently mounting the ends of said formnig and finishing rollers to permit changes in the size of said wrapping and finishing chambers to accommodate varying quantities of crop material, cutting means located within said finishing chamber for cutting said core into pellets, a spindle extending through said wrapping chamber and into said finishing chamber adjacent the cutting means, said spindle defining openings for introducing additives into said chambers, and means for driving said spindle.

9. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the angular direction of rotation of said forming rollers, means for resiliently mounting the ends of said rollers for radial movement relative to the core to permit changes in the size of said wrapping chamber whereby the wrapping chamber can accommodate varying quantities of crop material being fed thereto, and cutting means for cutting said core into pellets.

10. A pelleting device for feed crops including a plurality of forming rollers, each generally in the shape of a hyperboloid varying in diameter from one end to the other and arranged in position to provide a wrapping chamber therebetween for forming the material into a core, means for feeding crop material into said wrapping chamber, means for rotating said rollers in a common direction, the axes of said forming rollers being skewed in relation to said wrapping chamber and being circumferentially displaced about said wrapping chamber in the direction of rotation of said forming rollers, said rollers being rubber-coated, and cutting means for cutting said core into pellets.

11. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the angular direction of rotation of said forming rollers, means for resiliently mounting the ends of said forming rollers to permit changes in hte size of said wrapping chamber to accommodate varying quantities of crop material, a cutter wheel for cutting said core into pellets, and stripper wheels located adjacent the exit end of said forming chamber and positioned to cooperate with said cutter wheel to strip the pellets therefrom.

12. A pelleting device for feed crops including a plurality of forming rollers arranged in position to provide a wrapping chamber therebetween for forming the material into a core, means for feeding crop material into said wrapping chamber, means for rotating said rollers in a common direction, the axes of said forming rollers being skewed in relation to said wrapping chamber so that at one end thereof the forming rollers are circumferentially displaced about said wrapping chamber in the direction of angular rotation of said forming rollers, means for resiliently mounting the ends of said rollers to permit changes in the size of said wrapping chamber whereby the wrapipng chamber can accommodate varying quantities of crop material being fed thereto, cutting means for cutting said core into pellets, a spindle extending through said wrapping chamber and into said finishing chamber adjacent the cutting means, and means for driving said spindle.

13. A pelleting device for feed crops including a plurality of forming rollers, each generally in the shape of a hyperboloid varying in diameter from one end to the other, arranged in position to provide a wrapping chamber therebetween for forming the material into a core, means for feeding crop material into said wrapping chamber, means for rotating said rollers in a common direction, the axes of said forming rollers being skewed in relation to said wrapping chamber and being circumferentially displaced about said wrapping chamber in the direction of angular rotation of said forming rollers, means for resiliently mounting the ends of said forming rollers to permit changes in the size of said wrapping chamber to accommodate varying quantities of crop material, cutting means for cutting said core into pellets, a spindle extending through said wrapping chamber and into said finishing chamber adjacent the cutting means, said spindle defining openings for introducing additives into said chambers, and means for driving said spindle.

References Cited

UNITED STATES PATENTS

| | | |
|---|---|---|
| 963,823 | 7/1910 | Spoon. |
| 2,893,308 | 7/1959 | Bodisch _____________ 100—15 |
| 3,191,366 | 6/1965 | Molitovisz ___________ 56—1 |
| 3,244,088 | 4/1966 | Bushmeyer et al. ______ 100—89 |
| 3,269,098 | 8/1966 | Bushmeyer et al. _______ 56—1 |
| 3,316,694 | 5/1967 | McColly et al. _____ 100—89 X |
| 3,323,445 | 6/1967 | Bushmeyer et al. _____ 100—86 |

LOUIS O. MAASSEL, *Primary Examiner.*